Patented Aug. 21, 1951

2,564,685

UNITED STATES PATENT OFFICE 2,564,685

HALOGENATED TERPENE ADDITION COMPOUNDS

Leo A. Goldblatt and Dorothy M. Oldroyd, New Orleans, La., assignors to United States of America as represented by the Secretary of Agriculture No Drawing. Application July 9, 1946, Serial No. 682,278

6 Claims. (Cl. 260—648)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to certain new halogenated terpene addition compounds and to a process for preparing them.

We have found that whole molecules of halogenated organic compounds can be added to unsaturated terpenes in the presence of a suitable catalyst and that the addition products can be obtained in good yield. The terms "addition products," "addition compounds" and "molecular adducts" are employed here in their commonly accepted sense. They define monomeric products, and signify that the molecular weight is the sum of the molecular weights of the two components or the sum multiples of the molecular weights. The reaction proceeds quite readily and smoothly, especially in the case of $\beta$-pinene and carbon tetrabromide or tetrachloride, for example, and somewhat less readily when, for example, chloroform is used. Dipentene reacts less readily than $\beta$-pinene.

The following examples will illustrate the compounds of this invention, one method of making them, and their uses. It is to be understood that these examples are for the purpose of illustration only and that our invention is not limited thereby.

Example 1

27 grams of $\beta$-pinene (0.2 mole), 62 grams of carbon tetrachloride (0.4 mole), and 2 grams of benzoyl peroxide (0.01 mole) were mixed in a reaction flask and were heated under a reflux condenser at atmospheric pressure for 2.5 hours. The temperature in the reaction mixture gradually rose from 93° to 105° C. At the end of 2.5 hours the product was steam distilled to remove excess carbon tetrachloride and unreacted $\beta$-pinene. The viscous semi-solid addition product remaining was separated from water resulting from the steam distillation. The weight of this product when dry was 57 grams, corresponding to a yield of approximately 95 percent. It had a density of 1.261 grams per cc. at 26° C. and a refractive index of 1.522 at 25° C. This material was dissolved in alcohol and a white solid crystallized out which melted at 42–44° C. and showed a specific optical rotation $[\alpha]_D = -61.8°$ (10 percent solution in ethanol). The chlorine content of this crystalline product was 48.5 percent, which corresponds closely with the theoretical figure of 48.9 percent chlorine in a compound having the formula $C_{11}H_{16}Cl_4$. This is the compound that would be expected from the molecular addition of carbon tetrachloride to $\beta$-pinene, as illustrated in the following equation.

$$C_{11}H_{16} + CCl_4 = C_{11}H_{16}Cl_4$$

Example 2

27 grams of $\beta$-pinene (0.2 mole), 48 grams of chloroform (0.4 mole) and 4 grams of benzoyl peroxide (0.02 mole) were heated under a reflux condenser at atmospheric pressure for 4 hours. The temperature rose gradually from 75° to 78° C. At the end of 4 hours the product was steam distilled to remove excess chloroform and unreacted $\beta$-pinene. The addition product was recovered in the form of a viscous oily liquid and amounted 15 grams (approximately 30 percent yield). It had a density of 1.144 grams per cc. at 26° C. and a refractive index of 1.528 at 26° C. On analysis, this product showed 23.3 percent chlorine. By increasing the time of heating under reflux to 24 hours, the yield was increased to 43 percent.

Example 3

27 grams of dipentene (0.2 mole), 62 grams of carbon tetrachloride (0.4 mole), and 2.0 grams of benzoyl peroxide (0.01 mole) were heated under a reflux condenser for 24 hours at atmospheric pressure. The temperature rose gradually from 93° to 96° C. The product was then steam distilled to remove the excess carbon tetrachloride and unreacted dipentene. The addition product in the form of a viscous oily residue amounted to 26 grams (45 percent yield). It had a density of 1.258 grams per cc. at 23° C. and a refractive index of 1.531 at 23° C. On analysis it showed 40.6 percent chlorine.

Example 4

27 grams of $\beta$-pinene (0.2 mole), 23.75 grams of hexachloroethane (0.1 mole), and 0.5 grams of benzoyl peroxide (0.002 mole) were heated on the steam bath under a reflux condenser at atmospheric pressure for 5 hours. At the end of the 5 hours, the reaction mixture was steam distilled to remove unreacted $\beta$-pinene and hexachloroethane. The crystalline residue was separated from water from the steam distillation. The weight of the crude product thus obtained was 22 grams, corresponding to a yield of approximately 60 percent. This product was dissolved in ethanol and the white crystalline material which was obtained had a melting point of 144–146° C.

Example 5

27 grams of $\beta$-pinene (0.2 mole), 16.6 grams of carbon tetrabromide (0.05 mole), and 0.5 grams benzoyl peroxide (0.002 mole) were mixed in a reaction flask and were heated on a steam bath under a reflux condenser at atmospheric pressure for 1.25 hours. An exothermal reaction occurred and the temperature in the reaction mixture rose to 160° C., but then receded to 91° C., where it was maintained by the steam bath. At the end of the 1.25 hours the product was steam distilled to remove excess reactants. The addition product in the form of a viscous residue was separated from water resulting from the steam distillation. The weight of the product was 22.7 grams, corresponding to a yield of approximately 95 percent. This product had a density of approximately 1.55 grams per cc. at 25° C. and a refractive index of 1.5695 at 20° C.

*Example 6*

27 grams of β-pinene (0.2 mole), 50.6 grams bromoform (0.2 mole), and 0.5 gram of benzoyl peroxide (0.002 mole) were mixed in a reaction flask and were heated on a steam bath under a reflux condenser at atmospheric pressure for 1.25 hours. An exothermal reaction occurred and the temperature in the reaction mixture rose to 103° C., then receded to 95° C., where it was maintained by the steam bath. At the end of 1.25 hours, the product was steam distilled to remove unreacted β-pinene and bromoform. The addition product in the form of an oily residue was separated from water resulting from the steam distillation. The weight of the product was 24.7 grams, corresponding to a yield of approximately 30 percent. It had a refractive index of 1.568 at 21° C. and a density of 1.62 grams per cc. at 25° C.

In addition to benzoyl peroxide, other catalysts, such as acetyl peroxide, naphthoyl peroxide, lauroyl peroxide, and the like may be used. Other compounds may also be used as one of the halogenated reactants, such as carbon tetrafluoride, dichlorodifluoromethane, monochlorotrifluoromethane, trichloromonofluoromethane, and the like.

In all the examples cited, the addition product was recovered by removing the unreacted components from the reaction mass by means of steam distillation, but it is to be understood that this step in the process is not critical and that other methods of recovering the reaction product may also be used, such as fractional distillation either in vacuo or at atmospheric pressure, solvent extraction, or combinations of any of these methods.

Products of this invention are useful as germicidal and insecticidal agents. We have found them to be effective against certain common soil and water bacteria and molds such as *Sarcina lutea, Bacillus subtilis, B. mycoids, Penicillium luteum,* and *Aspergillius flavus.* For example, 0.5 ml. of a 1 percent alcoholic solution of the addition product of β-pinene and carbon tetrachloride diluted with 20 ml. of suitable culture media completely inhibited the growth of the organisms mentioned above when incubated at 30° C. for 24 to 48 hours. In contrast, heavy growth of these same organisms was obtained in control cultures similarly treated under the same conditions with 0.5 ml. of alcohol alone. In other control tests, no evidence of growth of any micro-organisms was found in any culture inoculated solely with any of the addition products.

The addition products of this invention may be applied as germicides and insecticides in a variety of ways, for example as aerosols, as compositions in the form of solutions in suitable solvents, such as alcohol, acetone, carbon tetrachloride, and so forth; emulsions or suspensions in oil or water or in paints and varnishes; pastes with lanolin or carbowax; dusts in combination with talc, bentonite, diatomaceous earth, pyrophyllite, and so forth. They may also be used in combination with other germicidal and insecticidal agents, such as DDT, boric acid, rotenone, nicotinic sulfate, Bordeaux mixture, and so forth.

The use of the compounds of this invention as plasticizers, flame-proofing agents, additives for lubricating oils and for other purposes is also indicated.

It is noted that only in Examples 1 and 4 were crystalline adducts obtained, namely, from beta-pinene and the fully chlorinated compounds carbon tetrachloride and hexachloroethane.

Having thus described our invention, we claim:

1. A beta-pinene-carbon tetrachloride adduct prepared by heating beta-pinene with carbon tetrachloride in the presence of an organic peroxide catalyst.

2. A process of preparing a beta-pinene addition compound comprising heating a reaction mixture, the reactive components of which mixture essentially consist of beta-pinene and a fully chlorinated paraffin hydrocarbon having no more than two carbon atoms, namely, taken from the group consisting of carbon tetrachloride and hexachloroethane, in the presence of an organic peroxide catalyst.

3. A process of preparing an addition compound of beta-pinene comprising heating with a reaction mixture, the reactive components of which mixture essentially consist of beta-pinene and carbon tetrachloride, in the presence of benzoyl peroxide at about 93 to 105° C.

4. A beta-pinene-hexachloroethane adduct prepared by heating beta-pinene with hexachloroethane in the presence of an organic peroxide catalyst.

5. A beta-pinene adduct of a compound of the group consisting of carbon tetrachloride and hexachloroethane prepared by heating beta-pinene with a compound of said group in the presence of an organic peroxide catalyst.

6. A process of preparing a crystalline beta-pinene addition compound comprising heating a reaction mixture, the reactive components of which mixture essentially consist of beta-pinene and a fully chlorinated paraffin hydrocarbon having no more than two carbons, namely, taken from the group consisting of carbon tetrachloride and hexachloroethane, in the presence of an organic peroxide catalyst, steam distilling to remove an excess of said chlorinated hydrocarbon and unreacted beta-pinene, dissolving the addition product in alcohol, and crystallizing therefrom the said addition compound.

LEO A. GOLDBLATT.
DOROTHY M. OLDROYD.

REFERENCES CITED

The following references are of record in the file of this patent:

UNITED STATES PATENTS

| Number | Name | Date |
|---|---|---|
| 2,354,775 | Rummelsburg | Aug. 1, 1944 |
| 2,367,155 | Thompson | Jan. 9, 1945 |
| 2,383,084 | Rummelsburg | Aug. 21, 1945 |
| 2,384,400 | Rummelsburg | Sept. 4, 1945 |
| 2,398,430 | Joyce | Apr. 16, 1946 |

OTHER REFERENCES

Kharasch: "Science," vol. 102, page 128 (1945).